United States Patent
Buxton

(10) Patent No.: US 11,404,173 B2
(45) Date of Patent: Aug. 2, 2022

(54) DOUBLE POLOIDAL FIELD COILS

(71) Applicant: Tokamak Energy Ltd, Abingdon (GB)

(72) Inventor: Peter Buxton, Abingdon (GB)

(73) Assignee: Tokamak Energy Ltd., Abingdon (GB)

( * ) Notice: Subject to any disclaimer, the term of this patent is extended or adjusted under 35 U.S.C. 154(b) by 0 days.

(21) Appl. No.: 16/769,816

(22) PCT Filed: Dec. 7, 2018

(86) PCT No.: PCT/GB2018/053564
§ 371 (c)(1),
(2) Date: Jun. 4, 2020

(87) PCT Pub. No.: WO2019/111019
PCT Pub. Date: Jun. 13, 2019

(65) Prior Publication Data
US 2020/0373021 A1 Nov. 26, 2020

(30) Foreign Application Priority Data
Dec. 8, 2017 (GB) .................................... 1720518

(51) Int. Cl.
*G21B 1/05* (2006.01)
*H01F 6/06* (2006.01)

(52) U.S. Cl.
CPC ............... *G21B 1/057* (2013.01); *H01F 6/06* (2013.01)

(58) Field of Classification Search
CPC . G21B 1/05; G21B 1/057; H05H 1/10; H05H 1/12
USPC .................................................. 376/121, 133
See application file for complete search history.

(56) References Cited

U.S. PATENT DOCUMENTS

| 3,886,402 | A | * | 5/1975 | Furth | G21B 1/057 315/111.71 |
| 4,087,322 | A | | 5/1978 | Marcus | |
| 4,115,190 | A | * | 9/1978 | Clarke | H05H 1/12 376/123 |
| 2010/0046688 | A1 | * | 2/2010 | Kotschenreuther | G21B 1/057 376/134 |

(Continued)

FOREIGN PATENT DOCUMENTS

WO    WO-2013030554 A1 *  3/2013 ............. G21B 1/057

OTHER PUBLICATIONS

Yanagi, Nagato, et al. "Magnet design with 100-kA HTS STARS conductors for the helical fusion reactor." Cryogenics 80 (2016): 243-249. (Year: 2016).*

(Continued)

*Primary Examiner* — Jack W Keith
*Assistant Examiner* — Jinney In Ney Kil
(74) *Attorney, Agent, or Firm* — Michael Best & Friedrich LLP

(57) ABSTRACT

A poloidal field coil assembly for use in a tokamak. The poloidal field coil assembly comprises inner and outer poloidal field coils and a controller. The inner poloidal field coil is configured for installation inside a toroidal field coil of the tokamak. The outer poloidal field coil is configured for installation outside the toroidal field coil. The controller is configured to cause current to be supplied to the inner and outer poloidal field coils such that the combined magnetic field produced by the inner and outer poloidal field coils has a null at the toroidal field coil.

9 Claims, 3 Drawing Sheets

(56) References Cited

U.S. PATENT DOCUMENTS

| | | | |
|---|---|---|---|
| 2010/0119025 A1* | 5/2010 | Kotschenreuther | G21B 1/01 |
| | | | 376/134 |
| 2011/0170649 A1* | 7/2011 | Kotschenreuther | G21B 1/13 |
| | | | 376/133 |
| 2014/0211900 A1 | 7/2014 | Kingham et al. | |
| 2016/0232988 A1* | 8/2016 | Sykes | G21B 1/05 |
| 2017/0032851 A1* | 2/2017 | Sykes | H05H 1/12 |
| 2017/0236600 A1* | 8/2017 | Kingham | H05H 1/12 |
| | | | 376/137 |

OTHER PUBLICATIONS

Sykes, Alan, et al. "Recent advances on the spherical tokamak route to fusion power." IEEE Transactions on Plasma Science 42.3 (2014): 482-488. (Year: 2014).*
International Preliminary Report on Patentability for Application No. PCT/GB2018/053564 dated Nov. 19, 2019 (9 pages).
Search Report issued by the United Kingdom Intellectual Property Office for Application No. 1720518.8 dated Jun. 11, 2018 (3 pages).

* cited by examiner

DOUBLE POLOIDAL FIELD COILS

FIELD OF THE INVENTION

The present invention relates to tokamak plasma chambers. In particular, it relates to the positioning of poloidal field coils, relative to the toroidal field coil.

BACKGROUND

The challenge of producing fusion power is hugely complex. Many alternative devices apart from tokamaks have been proposed, though none have yet produced any results comparable with the best tokamaks currently operating such as JET.

World fusion research has entered a new phase after the beginning of the construction of ITER, the largest and most expensive (c15bn Euros) tokamak ever built. The successful route to a commercial fusion reactor demands long pulse, stable operation combined with the high efficiency required to make electricity production economic. These three conditions are especially difficult to achieve simultaneously, and the planned programme will require many years of experimental research on ITER and other fusion facilities, as well as theoretical and technological research. It is widely anticipated that a commercial fusion reactor developed through this route will not be built before 2050.

To obtain the fusion reactions required for economic power generation (i.e. much more power out than power in), the conventional tokamak has to be huge (as exemplified by ITER) so that the energy confinement time (which is roughly proportional to plasma volume) can be large enough so that the plasma can be sufficiently hot for thermal fusion to occur.

WO 2013/030554 describes an alternative approach, involving the use of a compact spherical tokamak for use as a neutron source or energy source. The low aspect ratio plasma shape in a spherical tokamak improves the thermal confinement time and allows net power generation in a much smaller machine. However, a small diameter central column is a necessity, which presents challenges for design of the toroidal magnet required for plasma stability. To allow sufficient current density to achieve the high magnetic fields required, superconducting magnets are used for at least the toroidal field (TF) coil of the spherical tokamak.

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

ReBCO is typically manufactured as tapes, with a structure as shown in FIG. 1. In general, such tape 500 is generally approximately 100 microns thick, and includes a substrate 501 (typically electropolished hastelloy approximately 50 microns thick), on which is deposited by IBAD, magnetron sputtering, or another suitable technique a series of buffer layers known as the buffer stack 502, of approximate thickness 0.2 microns. An epitaxial ReBCO-HTS layer 503 (deposited by MOCVD or another suitable technique) overlays the buffer stack, and is typically 1 micron thick. A 1-2 micron silver layer 504 is deposited on the HTS layer by sputtering or another suitable technique, and a copper stabilizer layer 505 is deposited on the tape by electroplating or another suitable technique, which often completely encapsulates the tape.

The substrate 501 provides a mechanical backbone that can be fed through the manufacturing line and permits the growth of subsequent layers. The buffer stack 502 is required to provide a biaxially textured crystalline template upon which to grow the HTS layer, and prevents chemical diffusion of elements from the substrate to the HTS which damage its superconducting properties. The silver layer 504 is required to provide a low resistance interface from the ReBCO to the stabiliser layer, and the stabiliser layer 505 provides an alternative current path in the event that any part of the ReBCO ceases superconducting (enters the "normal" state).

In order to form high current capacity conductors, HTS tapes can be arranged to form cables. In each cable, several tapes are present, and the copper stabiliser layers of all the tapes are connected (generally via additional copper cladding). There are two general approaches to forming cables—the HTS tapes can be transposed and/or twisted, or the cables can be stacked. Transposed or twisted cables are often used in AC or fast-ramped magnets, as this construction greatly reduces coupling losses for the magnet. Stacked cables are often used in slow-ramped magnets, e.g. the TF coils of a tokamak, as this allows the tapes to be arranged relative to the local magnetic field in such a way as to maximise the critical current $I_C$.

The voltage across a length of HTS tape depends on transport current I in a highly nonlinear way, which is typically parameterised by:

$$V_{HTS} = E_0 \left(\frac{I}{I_C}\right)^n$$

where $E_0$=100 nV/m is the defined critical current criterion, and n is an experimental parameter that models the sharpness of the superconducting to normal transition; n is typically in the range 20-50 for ReBCO. Depending on the value of n, the voltage is negligible for values of $I/I_C$<~0.8.

When the current in the tape approaches the critical current, the HTS tape will cease superconducting. This can happen either by an increase in the transport current I, or a reduction in the critical current $I_C$. Several factors may reduce the critical current, most notably temperature, external magnetic fields, and strain. Reducing any of these factors will improve the stability of the HTS tape.

SUMMARY

According to a first aspect of the invention, there is provided a poloidal field coil assembly for use in a tokamak. The poloidal field coil assembly comprises inner and outer poloidal field coils and a controller. The inner poloidal field coil is configured for installation inside a toroidal field coil of the tokamak. The outer poloidal field coil is configured for installation outside the toroidal field coil. The controller is configured to cause current to be supplied to the inner and outer poloidal field coils such that the combined magnetic field produced by the inner and outer poloidal field coils has a null at the toroidal field coil.

According to a second aspect, there is provided a magnet assembly for use in a tokamak. The magnet assembly comprising a poloidal field coil assembly according to the first aspect and a toroidal field coil comprising high temperature superconductor. The inner and outer poloidal field coils are respectively located inside and outside the toroidal field coil.

According to a third aspect, there is provided a tokamak comprising a toroidal plasma chamber and a magnet assembly according to the second aspect.

DETAILED DESCRIPTION

Figure 1:
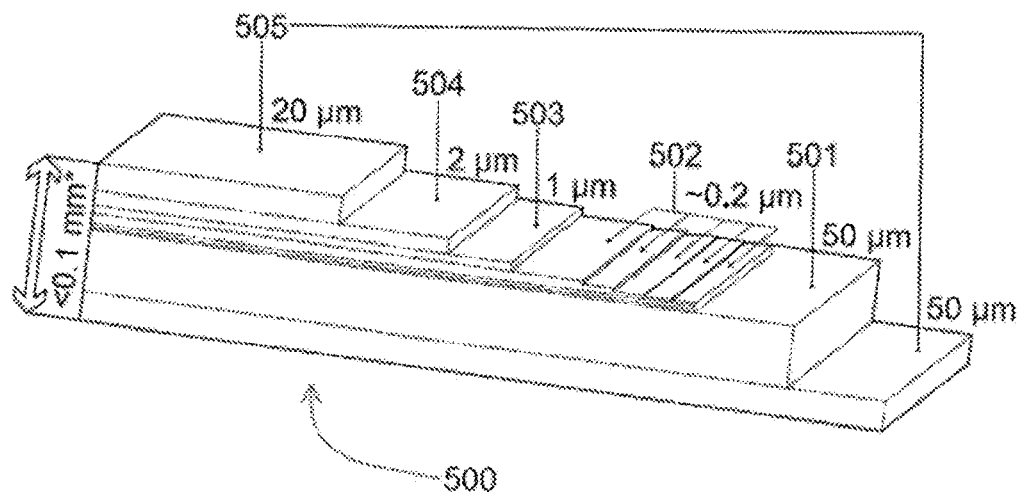
FIG. 1 is a schematic illustration of an HTS tape.
Figure 2:
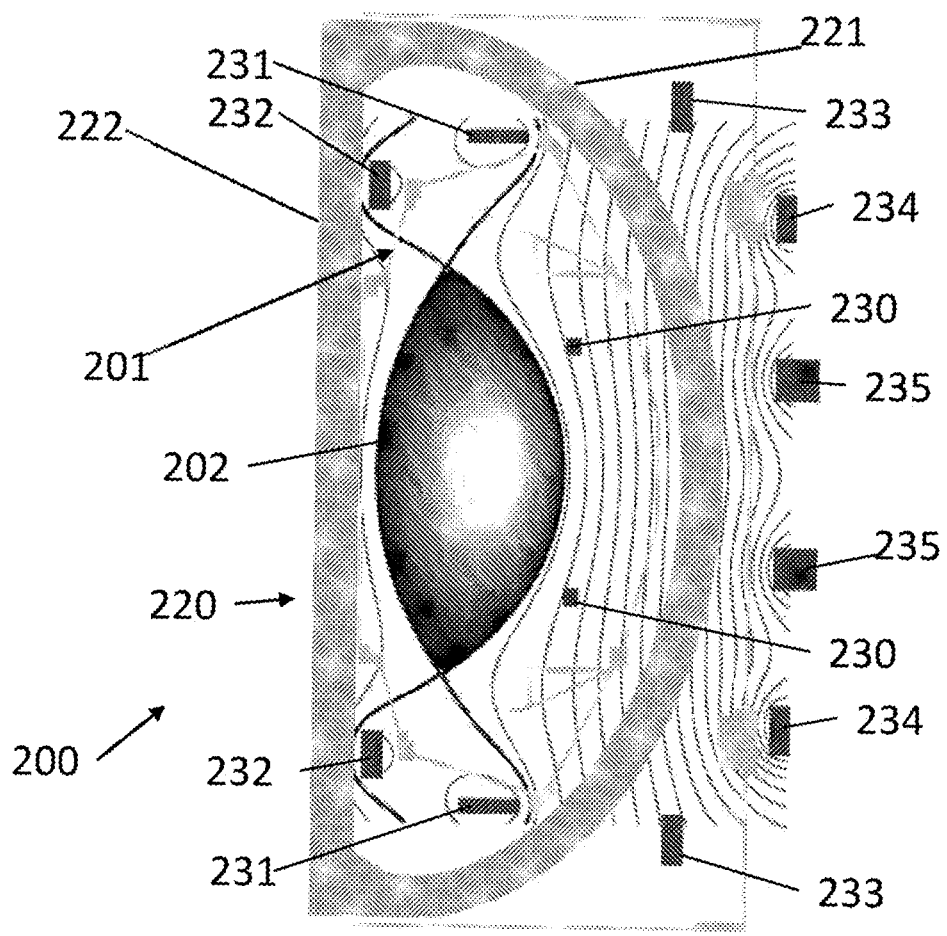
FIG. 2 is a cross section of a tokamak in the poloidal plane.

A cross section of one side of a tokamak is shown in FIG. 2. The tokamak 200 comprises a toroidal plasma chamber 201, a toroidal field (TF) coil 220 having return limbs 221 and a central column 222, and poloidal field (PF) coils 230, 231, 232, 233, 234, 235. The TF coil 220 provides a toroidal magnetic field within the plasma chamber 201. The PF coils perform various functions, e.g. the merging compression (MC) coils 230 provide a pulse to initiate the plasma, and the divertor coils 231, 232 elongate the plasma envelope 202 during operation of the tokamak. Broadly, the PF coils can be divided into two groups—the first group (which includes the MC coils 230) are energised for only short periods, typically during initialisation of the plasma, and the second group (which includes the divertor coils 231) are energised for long periods during operation of the tokamak.

Figure 3:
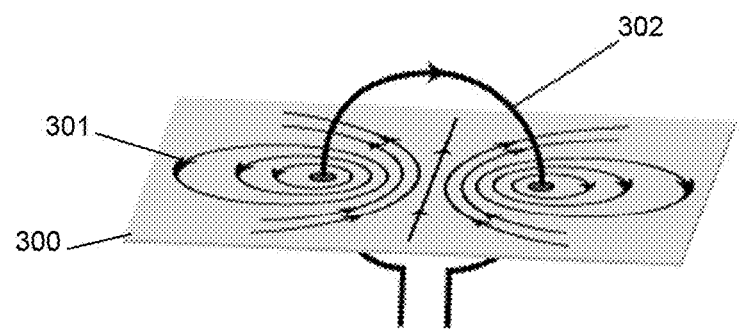
FIG. 3 is a diagram of the magnetic field produced by a wire coil.

Each PF coil is typically constructed as a single ring of conductor. The conductor may either be superconducting or normally conducting, depending on the properties required from the coil—e.g. coils which carry AC current would typically experience high losses if they were made from superconducting material, so normally conducting materials are preferred. FIG. 3 shows a cross section (on a plane 300) of the magnetic field 301 produced by a loop of conducting wire 302. The same field pattern will be produced by each PF coil. As can be seen, the field close to the PF coil is relatively strong.

Referring again to FIG. 2, it will be seen that several of the PF coils of the tokamak are close to the TF coil. This means that the PF coils will apply an external magnetic field to the TF coil, which will reduce the critical current of superconducting material in the TF coil.

Figure 4:
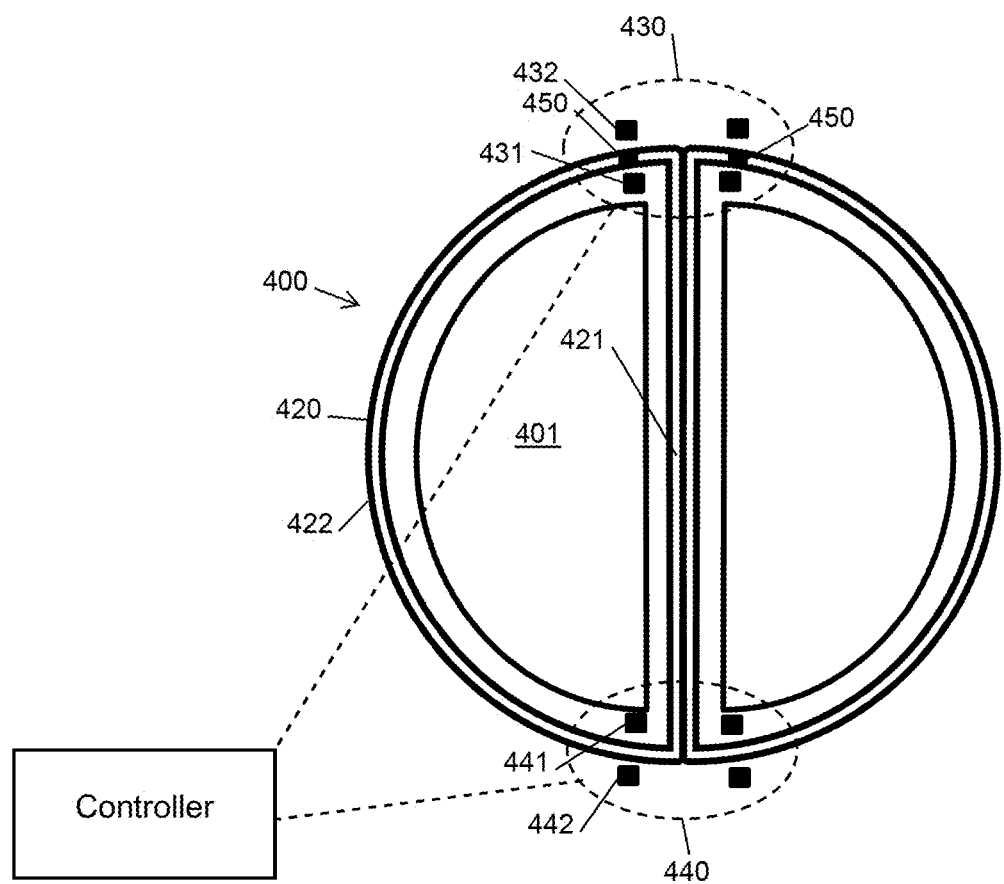
FIG. 4 is a cross section of an exemplary tokamak.

In order to avoid this effect, an alternative construction is proposed. This is shown in FIG. 4 for one set of divertor coils (equivalent to the divertor coils 231 in FIG. 2), but could be extended to any of the PF coils with suitable adjustments. FIG. 4 shows an exemplary tokamak 400 comprising a toroidal plasma chamber 401 and a TF coil 420 comprising a central column 421 and return limbs 422. The tokamak 400 also comprises upper and lower PF coil assemblies 430, 440, each of which comprises inner 431, 441 and outer 432, 442 PF coils. Each feature shown in FIG. 4 has cylindrical symmetry about the central column 421. Within each assembly, the inner PF coil 431, 441 is located inside the TF coil 420 (i.e. between the TF coil 420 and the toroidal plasma chamber 401), and the outer PF coil 432, 442 is located outside of the TF coil 420.

Figure 5:
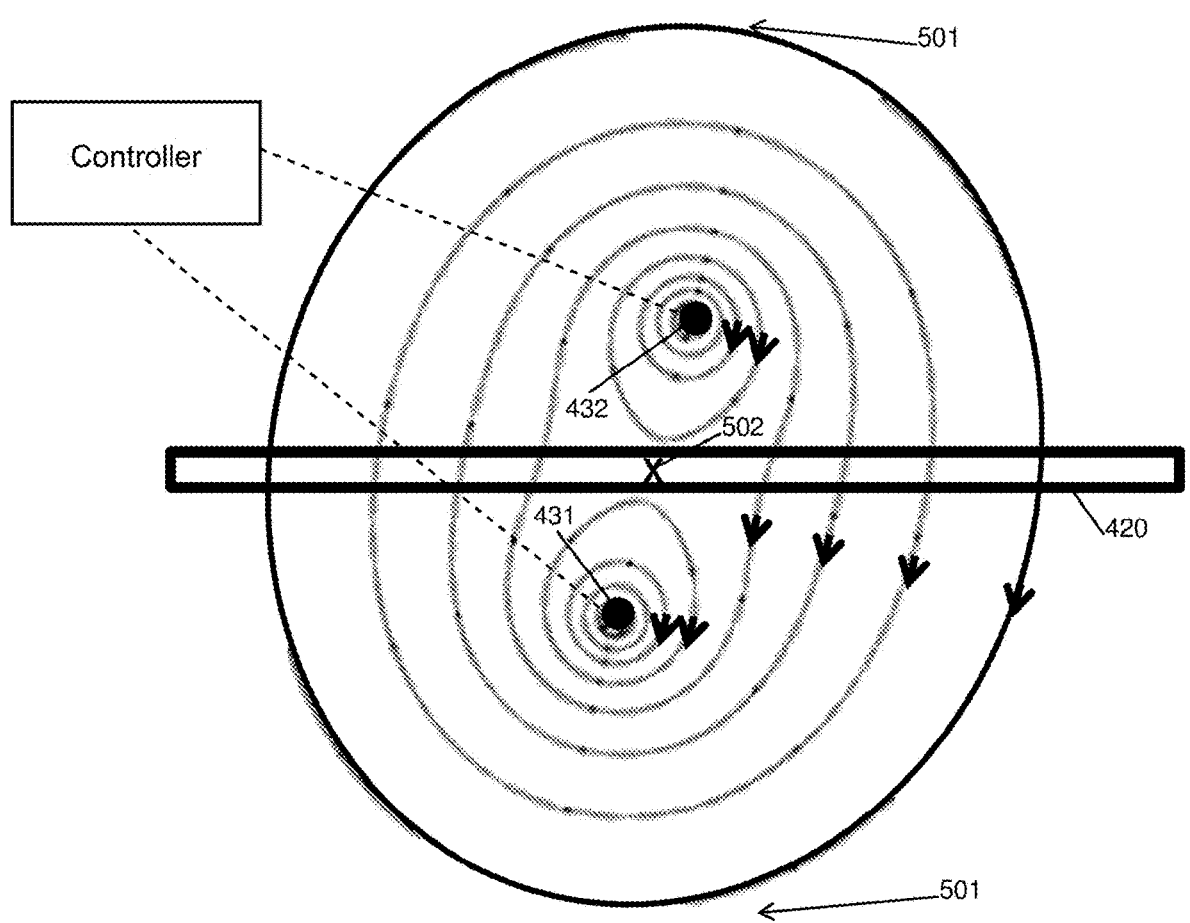
FIG. 5 is a close up of one of the poloidal field coil assemblies of FIG. 4.

FIG. 5 is a close up of the upper PF coil assembly 430, showing the magnetic field generated by the inner 431 and outer 432 PF coils during operation in the poloidal plane (to simplify the figure, fields from other components in the tokamak are ignored; but during the design process and when operational these other fields will be included and accounted for). The PF coil assembly 430 is configured such that the current in the inner and outer coils flows in the same direction ("into the page" in this example). The magnetic field between the two coils forms a null 502, which is located between the two coils at a distance which depends on the relative currents of the two coils. Outside of the two coils, in the far-field region 501, the magnetic fields produced by each coil will re-enforce each other. The current of each coil is controlled such that the far field 501 produced by the PF coil assembly is substantially the same as for the single equivalent field coil in FIG. 2, and such that the relative currents of the two coils causes the null 502 to be formed on the TF coil 420. This means that the effect of the magnetic field of the PF coil assembly on the critical current of the TF coil is considerably reduced compared to the effect of an equivalent single PF coil.

The exact location of the null on the TF coil may be chosen based on the design of the TF coil. For example, if there are any "hot spots" on the TF coil which would be expected to be less stable or have lower IC generally (e.g. joints 450), then the inner 431 and outer 432 PF coils may be positioned such that the null is located at the hot spot (e.g. joint).

This construction is most advantageous for replacing PF coils which are continuously active during operation of the tokamak and which are located close to the TF coils, such as the divertor coils. However, this construction can also be used to replace other PF coils of the magnet.

The construction may be used for either a spherical tokamak, or for a conventional large aspect ratio tokamak.

The invention claimed is:

1. A method of operating a magnet assembly in a tokamak, the method comprising:
   providing a magnet assembly including:
      a poloidal field coil assembly having an inner poloidal field coil and an outer poloidal field coil,
      a toroidal field coil including superconducting material, and
      a controller;
   installing the inner poloidal field coil inside the toroidal field coil;
   installing the outer poloidal field coil outside the toroidal field coil; and
   supplying, by the controller, current to the inner poloidal field coil and the outer poloidal field coil to create a combined magnetic field produced by the combination of the inner poloidal field coil and the outer poloidal field coil,
      wherein the combined magnetic field has a null at the toroidal field coil,
      wherein the controller causes the null at a predetermined location on the toroidal field coil.

2. A method according to claim 1, wherein the toroidal field coil includes a joint, and further comprising supplying, by the controller, current to the inner poloidal field coil and the outer poloidal field coil such that the null is located at the joint.

3. A method according to claim 1, wherein the tokamak is a spherical tokamak.

4. A method according to claim 1, wherein one or more of the toroidal field coil, the inner poloidal field coil, and the outer poloidal field coil include a high temperature superconductor.

5. A magnet assembly for use in a tokamak, the magnet assembly comprising:
   a poloidal field coil assembly;
   a toroidal field coil including superconducting material;
   an inner poloidal field coil installed inside the toroidal field coil;
   an outer poloidal field coil installed outside the toroidal field coil; and
   a controller configured to cause current to be supplied to the inner and outer poloidal field coils to create a combined magnetic field produced by the inner and outer poloidal field coils,
   wherein the combined magnetic field has a null at the toroidal field coil,
   wherein the controller is configured to cause the null at a predetermined location on the toroidal field coil.

6. A magnet assembly according to claim 5, wherein each poloidal field coil comprises a high temperature superconductor.

7. A magnet assembly according to claim 5, wherein the toroidal field coil comprises a joint, and wherein the inner and outer poloidal field coils are positioned such that the combined magnetic field produced by the inner and outer poloidal field coils has the null at the joint.

8. A tokamak comprising a toroidal plasma chamber and a magnet assembly according to 5.

9. A tokamak according to claim 8, wherein the tokamak is a spherical tokamak.

\* \* \* \* \*